Patented May 30, 1939

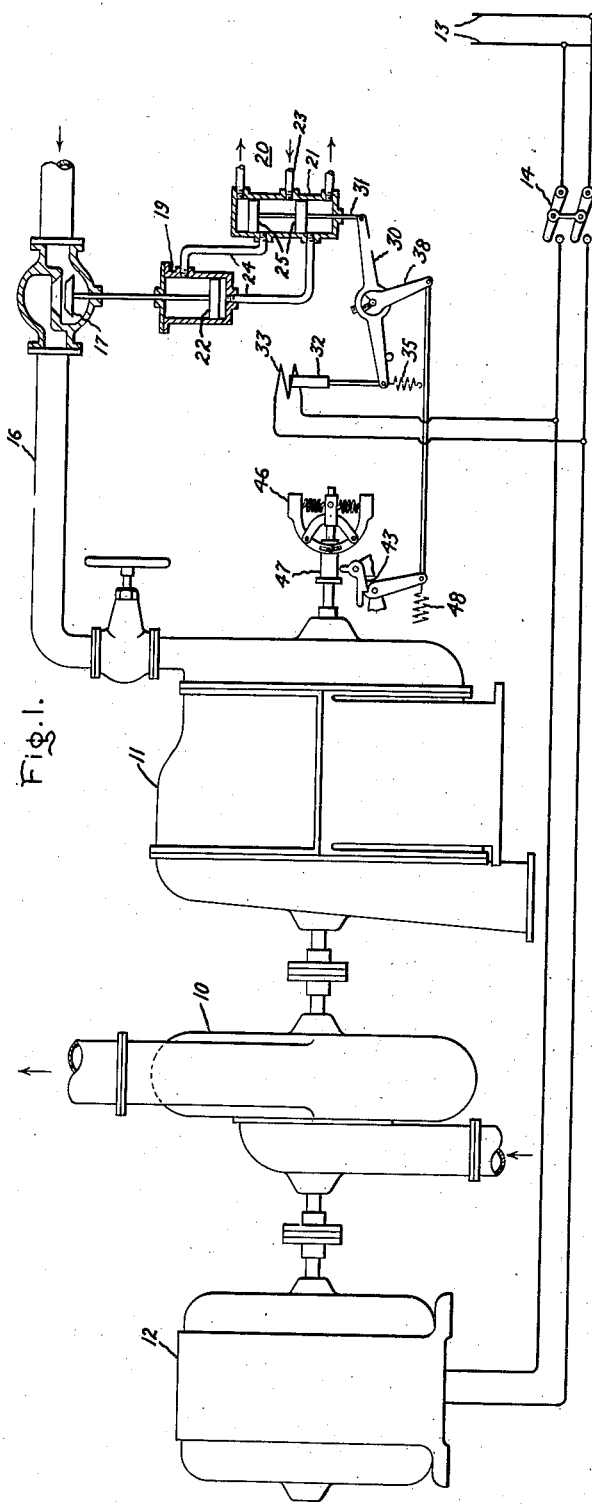

2,160,587

UNITED STATES PATENT OFFICE 2,160,587

CONTROL SYSTEM

Martin Gieseler, Berlin, Germany, assignor to General Electric Company, a corporation of New York Application April 2, 1937, Serial No. 134,590
In Germany July 24, 1936

2 Claims. (Cl. 60—6)

The present invention relates to control systems for an elastic fluid turbine adapted to operate alternatively with an electric motor or corresponding prime mover for driving a common load device such as a pump.

In an installation such as that described in the foregoing it is desirable to have the supply of operating fluid to the turbine initiated automatically upon cessation of operation of the electric motor. For example, a failure of the power system from which the motor is operated may be made to open the turbine supply valve and thus to continue the operation of the load device without interruption of service.

It is an object of the present invention to provide a simple and effective means whereby a turbine fluid supply valve which is controlled in the manner indicated in the foregoing may be additionally and independently controlled by a safety mechanism responsive to the speed of operation of the turbine.

The features of novelty which I desire to protect herein are pointed out with particularity in the appended claims. The invention itself, together with further objects and advantages thereof, may best be understood by reference to the following description taken in connection with the accompanying drawing, in which Fig. 1 represents diagrammatically a turbine installation suitably embodying the invention, while Figs. 2 and 3 show in elevation and in sectional plan view the details of certain of the operative elements of the control apparatus.

Referring to the drawing I have shown a load device, specifically a pump 10, which may be driven by an elastic fluid turbine 11 but which is preferably operated by an alternative driving means comprising an electric motor 12. The electric motor may be energized, for example, from a supply source 13 under the control of a series switch 14. The turbine 11, on the other hand, is shown as being supplied with elastic fluid by means of a conduit 16 incorporating a valve 17. This latter element is adapted to be moved between its open and closed positions by actuating means including a hydraulic motor 19. The direction of supply of operating fluid to the motor 19 is controlled by means of a pilot valve or device indicated as a whole by the numeral 20.

This pilot valve may comprise a cylinder 21 having an inlet connection 23 and connections 24 communicating with the fluid motor. The operation of the fluid motor is directly controlled by a pair of pilot valve heads 25 movable longitudinally of the cylinder 21 and adapted selectively to place one or the other of the conduits 24 in communication with the inlet connection 23. Thus, with the valve heads 25 in the position indicated, operating fluid under pressure is supplied to the upper side of the piston 22 of the motor 19 and discharged from the space below the piston 22 to impart opening motion to the valve 17.

In order to cause energization of the turbine 11 in the event of failure of the electrical supply system 13, means is provided for controlling the motion of the valve 17 in response to the condition of operation of the motor 12. Such means may include besides the fluid motor 19 and the pilot valve 20 an operative element in the form of a fulcrumed actuating lever 30 keyed to a rotatable shaft 27 and connecting with the valve heads 25 by means of a stem 31. The operation of this element is controlled by a condition responsive device such as a solenoid armature 32 in combination with a coil 33 connected across the power source 13. The arrangement of the aforementioned parts is such that as long as full voltage exists across the coil 33 the armature 32 will be drawn to its uppermost position and the valve 17 consequently closed. In the event of a failure of power, the lever 30 is turned about its fulcrum in a counterclockwise direction by means of a motive device such as a tension spring 35. Under these conditions the valve 17 will be opened to admit elastic fluid to the turbine 11 to drive the load device 10 independently of the motor 12.

For safety in operation it is desired to interrupt the supply of elastic fluid to the turbine 11 in case the speed of the turbine exceeds a predetermined safe value. In accordance with the present invention this is accomplished by the provision of speed responsive tripping means arranged to cooperate with the lever 30, the mode of cooperation being such that the lever is positively biased to valve closing position as soon as the tripping means operates.

In the arrangement illustrated in Figs. 2 and 3, there is provided a secondary driving member or crank arm 38 provided with a slot or recess 39. This recess is adapted to receive a coupling element or stud 41, movable with the lever 30, and to permit free movement of the lever within a certain range. Thus, as long as the crank arm 38 remains in the position in which it is illustrated the lever 30 is free to move between its valve opening and valve closing positions independently of the speed responsive mechanism.

The crank arm 38 is normally retained in position by means of a latched trip mechanism 43 which in turn is under the control of a speed responsive mechanism operatively associated with the turbine 11. This latter mechanism may take various forms but is illustrated as comprising a centrifugal device 46 connected with an axially movable sleeve 47, the sleeve being so arranged as to trip the latch mechanism whenever the speed of the turbine exceeds a predetermined safe value.

Upon the release of the latch mechanism the crank arm 38 is rotated in a clockwise direction to a second operative position under the influence of a motive element such as a tension spring 48. During the course of such rotation it engages the stud 41 and produces a corresponding movement of the lever 30. Under these conditions the lever is biased to its valve closing position, and further operation of the pilot valve in accordance with the demands of the condition responsive solenoid 32 is impossible.

It will be seen that my invention provides a simple and reliable turbine control in which a single pilot device is operated under the joint influence of a mechanism responsive to the speed of the turbine and another mechanism responsive to the condition of operation of an alternative driving means. While I have shown a particular embodiment of the invention, it will be understood by those skilled in the art that many modifications may be made without departing from the invention, and I aim by the appended claims to cover all such modifications as fall within the true spirit and scope of the foregoing disclosure.

What I claim as new and desire to secure by Letters Patent of the United States is:

1. In combination, a turbine fluid supply valve, means including an actuating lever for opening and closing the valve, condition responsive means for moving the lever to valve opening and closing positions, a secondary driving member having a lost motion connection with the actuating lever, the actuating lever being movable independently of the secondary member when the member is in a first operating position and being positively biased to valve closing position when the secondary member is in a second operating position, means including a trip mechanism for normally retaining the secondary member in its first operating position, and means responsive to a predetermined turbine speed for releasing the trip mechanism and causing the member to be moved to its second operating position.

2. In combination, a turbine fluid supply valve, means including a pivoted actuating lever movable within a certain range for opening and closing the valve, a coupling element movable with the lever, a crank arm associated with the lever and having a recess therein for receiving the coupling element, the recess permitting free movement of the actuating lever in one position of the crank arm is in such one position to move the actuating lever between its valve opening and closing positions, means retaining the crank arm in such one position as long as the turbine speed is below a predetermined safe valve, and means effective when the turbine speed exceeds the predetermined safe value to move the crank arm into engagement with the coupling element and thereby to bias the actuating lever to valve closing position independently of the condition responsive means.

MARTIN GIESELER.

CERTIFICATE OF CORRECTION.

Patent No. 2,160,587. May 30, 1939.

MARTIN GIESELER.

It is hereby certified that error appears in the printed specification of the above numbered patent requiring correction as follows: Page 2, second column, line 25, claim 2, after "arm" insert the comma and words , condition responsive means effective as long as the crank arm; line 29, same claim, for the word "valve" read value; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.